US005761690A

United States Patent [19]
Dao et al.

[11] Patent Number: 5,761,690
[45] Date of Patent: Jun. 2, 1998

[54] ADDRESS GENERATION APPARATUS AND METHOD USING A PERIPHERAL ADDRESS GENERATION UNIT AND FAST INTERRUPTS

[75] Inventors: Tan Nhat Dao; Duncan Fisher, both of Austin, Tex.

[73] Assignee: Motorola, Inc., Schaumburg, Ill.

[21] Appl. No.: 910,359

[22] Filed: Aug. 13, 1997

Related U.S. Application Data

[63] Continuation of Ser. No. 278,204, Jul. 21, 1994, abandoned.
[51] Int. Cl.$^6$ .................................................... G06F 12/00
[52] U.S. Cl. ........................................... 711/1; 711/218
[58] Field of Search ................................ 711/1, 200, 218

[56] References Cited

U.S. PATENT DOCUMENTS

| | | | |
|---|---|---|---|
| 4,949,391 | 8/1990 | Faulkerson et al. | 382/313 |
| 5,287,193 | 2/1994 | Lin | 358/261.1 |
| 5,321,806 | 6/1994 | Meinerth et al. | 345/522 |
| 5,339,416 | 8/1994 | Nakagami et al. | 395/677 |

Primary Examiner—Eddie P. Chan
Assistant Examiner—Kevin Verbrugge

[57] ABSTRACT

Data block identification within a processor 100 may be accomplished when the processor 100 receives an interrupt while performing a main set of operational codes. Upon receiving the interrupt, the processor 100 determines whether the interrupt is of a fast interrupt type. When the interrupt if of a fast interrupt type, the processor executes the operational codes identified by the interrupt without having to flag the main set of operational codes. Upon completion of the fast interrupt, the processor 100 resumes performing the main set of operational codes. In addition to performing the fast interrupt, the processor 100 contemporaneously performs a data block identification routine. When the data block identification routine identifies a data block, the main set of operational codes is interrupted to perform a data block service routine. The processor 100 includes an address generation unit 102 and a peripheral address generation unit 104. The peripheral address generation unit 104 will provide addresses for storing data samples in a data memory 103 in response to an interrupt request when address generation unit 102 does not have an available address register 113.

9 Claims, 4 Drawing Sheets

1

ADDRESS GENERATION APPARATUS AND METHOD USING A PERIPHERAL ADDRESS GENERATION UNIT AND FAST INTERRUPTS

This application is a continuation of prior patent application Ser. No. 08/278,204 filed Jul. 21, 1994, now abandoned.

TECHNICAL FIELD OF THE INVENTION

This invention relates generally to processors and, in particular, to a method and apparatus for identifying data blocks within such processors.

BACKGROUND OF THE INVENTION

Microprocessors, microcomputers, microcontrollers, and digital signal processors are known to execute a plurality of operational codes (op codes) to achieve a desired result. For example, digital signal processors (DSPs) may be used in telecommunication devices to execute a series of op codes to perform audio compression. While executing a main set of operational codes, or the main program, it is common for the processing device to receive an interrupt command. The interrupt may be initiated by control logic within the process when an event occurs. For example, an interrupt may be generated when a processing error occurs, an illegal instruction is received, a stack error occurs, or when a sample of a data block is received. The sample of a data block may be received from a peripheral device which may be on-chip or external to the processing device.

As an example of the data transfer process, assume that the processor is a DSP that is performing audio compression. During this process, a peripheral device, such as a microphone, receives an audio waveform. This audio waveform is sampled at a desired sampling rate to produce a series of digital audio samples. As each digital audio sample is generated, it must be stored in a data memory device for further processing. When a digital audio sample is ready to be stored, the main program, which may be executing an audio compression or audio manipulation algorithm, is interrupted. Generally, to store a digital audio sample, two instruction cycles: One for transmitting data from the peripheral device to a data register and the other for transmitting the digital audio sample to the data memory device or for transmitting from a peripheral to memory and from memory to a peripheral. To accomplish this, however, an address register in an address generation unit must be available to store the data memory address.

In most instances, an address register is not available because the address registers are being used by the main program, thus a long interruption must be instituted to store the digital audio sample. The long interrupt requires the main program to be flagged, which is accomplished by storing a status register, a loop counter, a loop address, address registers, data registers, a program counter, by stacking stack registers, by incrementing a stack pointer, and by clearing an external memory bit. Once the main program is accurately flagged, the digital audio sample is stored and the main program is resumed. To store one digital audio sample in this manner requires at least 10 instruction cycles. Thus, an additional eight instruction cycles are needed to store one digital audio sample under these conditions.

As mentioned, a digital audio sample may be stored in two instruction cycles when an address register is available. Such a process is referred to as a fast interrupt. During a fast interrupt, the main program is interrupted, but does not need to be flagged, thus 8 instruction cycles are saved. Unfortunately, when a digital audio sample is stored via a fast interrupt, its relationship with other digital audio samples of an audio data block is lost. When the data block relationship is lost, the digital audio samples cannot be retrieved in an identifiable way. To illustrate this, a DSP, when executing an audio compression, performs the audio compression on an entire block, or frame, of digital audio samples, wherein the relationship between the digital audio samples is important to achieve accurate audio compression. Thus, the digital audio samples must be stored in a readily retrievable manner, such that an entire audio data block, or frame, can accurately be retrieved by the main program, which cannot be done using a fast interrupt.

Thus, even though an address register may be available to perform a fast interrupt to store a digital audio sample, a long interrupt must be used such that the digital audio sample relationship may be maintained. The long interrupt is needed to increment a frame counter and do a comparison between the present frame count and a predetermined frame length. As is generally known, an audio data block, or frame, may include any number of digital audio samples, but is generally in the range of 30 to 300 samples. For an audio data block of 30 samples, an additional 120 instruction cycles are needed due to the long interrupt requirement.

Therefore, a need exists for a method and apparatus that allows for data block identification while utilizing a fast interrupt approach.

DETAILED DESCRIPTION OF A PREFERRED EMBODIMENT

Generally, the present invention provides a method and apparatus for identifying a data block within a processing device. This is accomplished when the processing device is performing a main set of operational codes and receives an interrupt. Upon receiving the interrupt, the processing device determines whether the interrupt is of a fast interrupt type. When the interrupt is of a fast interrupt type, the processing device executes the operational codes identified by the interrupt without having to flag the main set of operational codes. Upon completion of the fast interrupt, the processing device resumes performing the main set of operational codes. In addition to performing the fast interrupt, the processing device contemporaneously performs a data block identification routine. When the data block identification routine identifies a data block, the main set of operational codes is interrupted to perform a data block service routine. With such a method and apparatus, the present invention allows a processing device to store received data portions using fast interrupts while maintaining a data block, or frame, relationship between the stored data portions.

Figure 1:
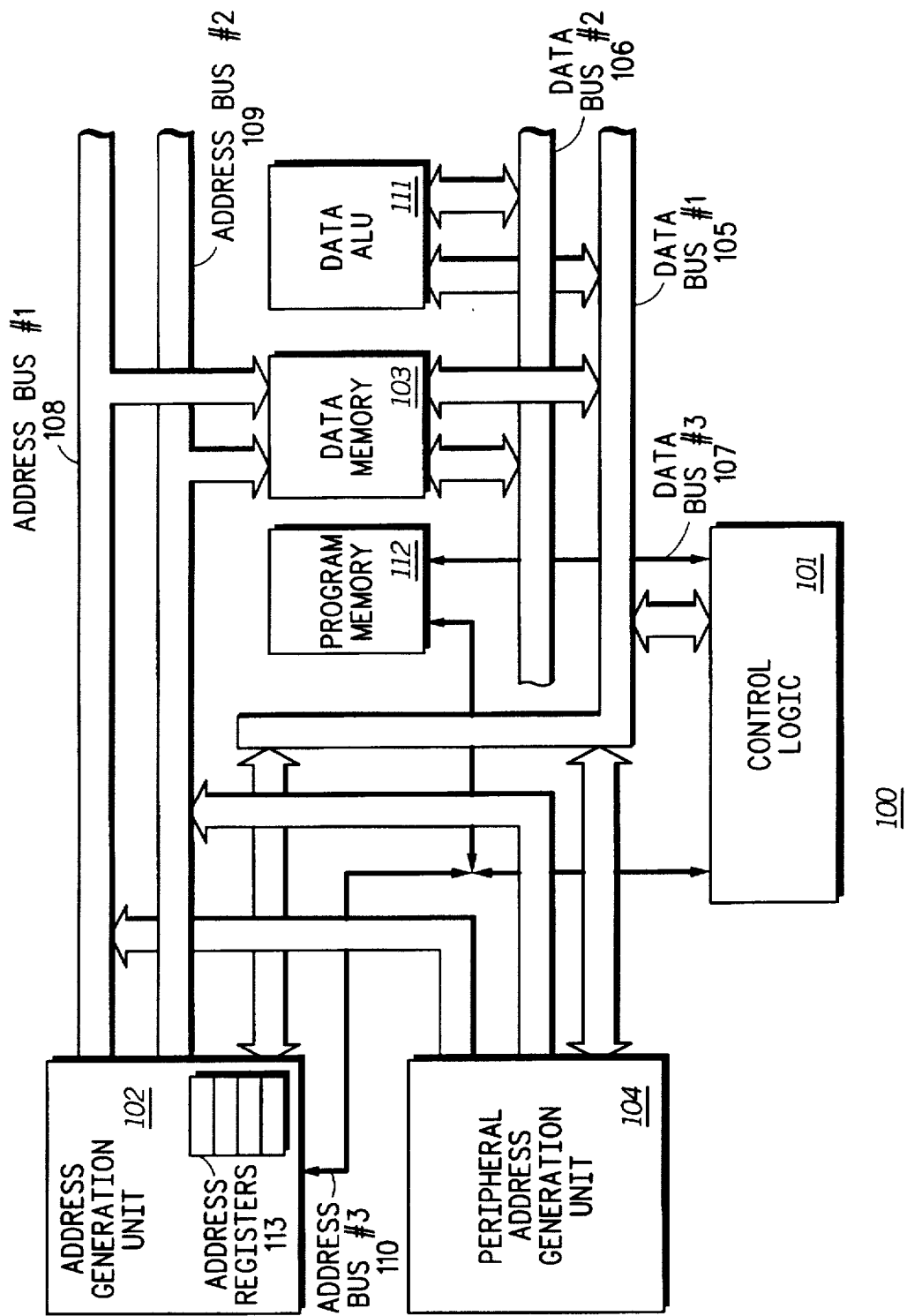
FIG. 1 illustrates a portion of a processor which incorporates the present invention.

The present invention can be more fully described with reference to FIGS. 1–4. FIG. 1 illustrates a portion of a processing device 100. As shown, the processing device 100 includes a control logic section 101, an address generation unit (AGU) 102, data memory 103, a peripheral address generation unit (PAGU) 104, three data buses 105–107, three address buses 108–110, a data arithmetical logic unit (ALU) 111, and a program memory device 112. The address generation unit 102 is further shown to include four address registers 113. Each of these elements, other than the PAGU 104, are well known elements and are described in Motorola publications: DSP56100, Digital Signal Processor Family Manual and DSP56166, Digital signal processor User's Manual. While the present invention, in the preferred embodiment, is designed for use within a DSP, one skilled in the art will appreciate that the present invention may be readily used in a microprocessor, a microcomputer, or a microcontroller that periodically receives data.

In operation, the processing unit 100 performs a main set of operational codes, which are stored in the program RAM 112, to achieve a desired result. While performing the main set of operational codes (main program), the processing device 100 periodically receives data samples, wherein a plurality of data samples makes up a data block or frame. Upon receiving a data sample from a peripheral device, the main program is interrupted, via a fast interrupt, such that the data sample may be properly stored while maintaining its relationship within the data block. To store the data sample, the control logic 101, based on programming instructions from a user, generates a signal. This signal indicates whether the AGU 10, the PAGU 104, or both units will generate data memory addresses. The number of addresses generated and which unit generates them is determined by the user of the processing device 100. For example, the user may program the processing device 100 to have the AGU 102 generate all the addresses for fast interrupt storage of incoming data samples, provided the AGU 102 has an available address register 113. If there is not an available address register 113, the PAGU 104 would generate the address. Alternatively, the user could program the processing device 100 to have the PAGU 104 generate all the addresses for the fast interrupt storage of data samples. Yet another alternative, the user could have both the AGU 102 and the PAGU 104 provide one address each for the fast interrupt storage. Still another alternative, the user could have the PAGU 104 provide addressing information for other services that enhances the performance of the AGU 102, in other words, provide additional AGU services.

As a working example of the processing device 100, assume that the processing device 100 is a DSP and has been programmed to perform audio compression within a communication device, such as a land mobile radio, a cellular telephone, audio equipment, or video equipment. The communication device receives an audio signal via a microphone which is routed to a codec unit within the DSP. The codec unit, which is an on-chip peripheral device, samples the audio signal to produce a plurality of digital audio samples. As each digital audio sample is generated, a fast interrupt is executed to store the digital audio sample. Contemporaneously to the fast interrupt, the PAGU 104 is performing a data block identification routine. Once the PAGU 104 has identified a data block, it generates a long interrupt which causes the main program to execute the audio compression algorithm on the newly identified data block. By having the PAGU 104 performing the data block identification routine, the storage of the incoming data samples can be stored using fast interrupts, thus saving 4 instruction cycles per data sample. In addition, by using the PAGU 104 to generate the address information for the fast interrupts, fast interrupts can be performed for each incoming data sample, regardless of whether the AGU 102 has an available address register 113.

Figure 2:
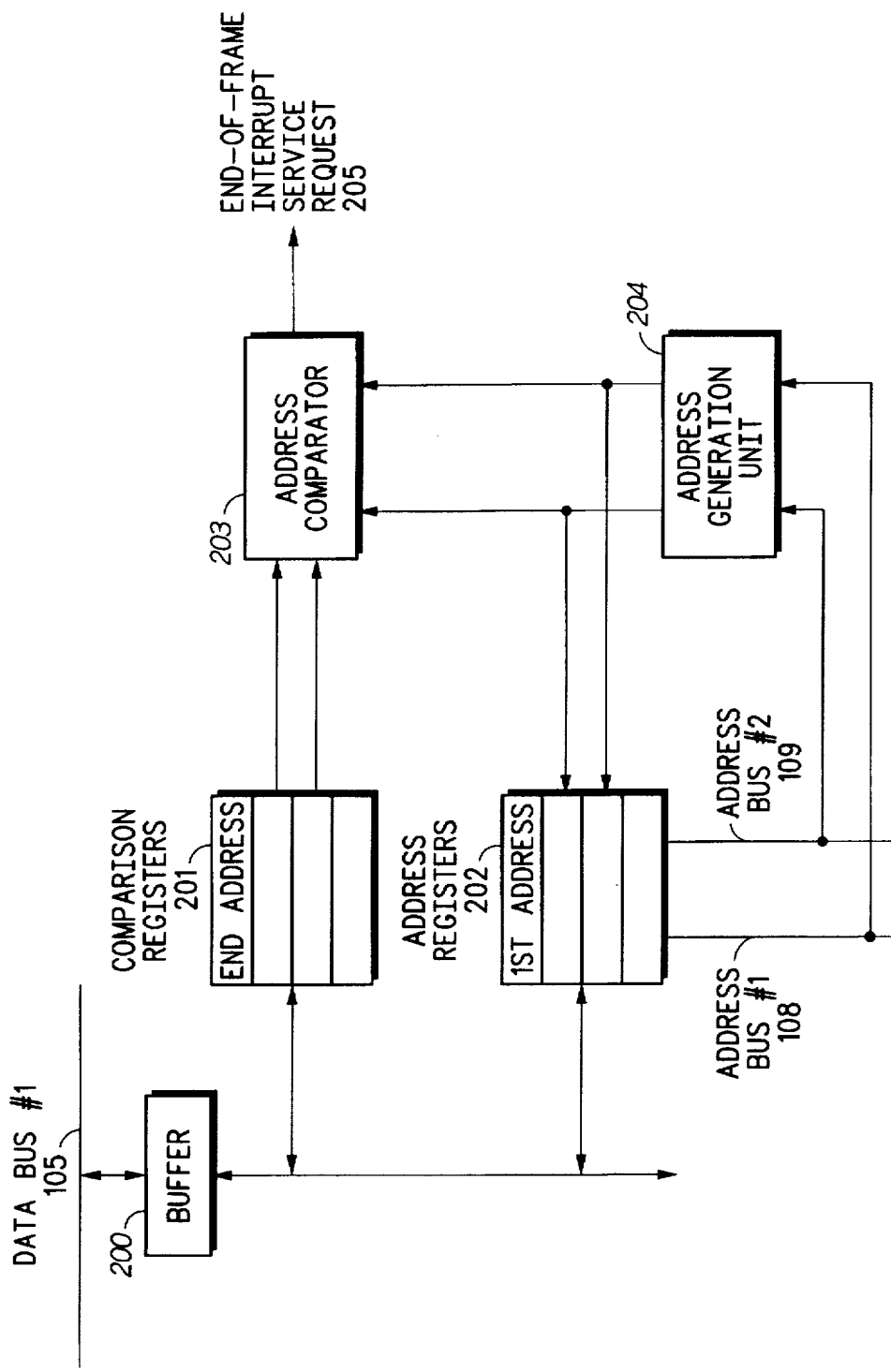
FIG. 2 illustrates a block diagram of the peripheral address generation unit in accordance with the present invention.

FIG. 2 illustrates the peripheral address generation unit (PAGU) 104 in more detail. As shown the PAGU 104 includes a buffer 200, comparison registers 201, address registers 202, an address comparator 203, and an address generation unit 204. While the comparison register 201 and the address register 202 are each shown to include four registers, it should be readily apparent to one skilled in the art that any number of registers, of any size, could be used. The number of registers within each of the comparison registers 201 and the address registers 202 simply allow for multiple data blocks to be simultaneously received and accurately stored. Thus, as shown, the processing device 100 may be simultaneously receiving four input signals.

As the processing device 100 is receiving an input signal while executing a main program, the comparison register 201 stores an ending address of a data block while the address registers 202 stores a beginning address of a data block. The beginning and ending addresses are determined by the user and entered into the program memory 112. When prompted, the program memory 112 provides the beginning and ending addresses to the comparison register 201 and address registers 202 via the data bus 105. Note that, as shown in FIG. 1, the data bus 105 is not directly coupled to the program memory 112. In a full embodiment of the processing device, however, the data buses 105 and 107 are coupled to an internal data bus switch and bit manipulation unit which, when appropriate, couples the data buses together.

Once the comparison register 201 and the address register 202 have received the beginning and ending addresses for a data block, the processing device 100 is ready to receive data. For the first data sample, the address generation unit 204 retrieves the beginning address stored in the address register 202 and places it on one of the address buses 108 and 109. The data memory 103 utilizes this address to store the first data sample of the block. Once the first data sample is stored, the address generation unit 204 adjusts the address in the address register 202, wherein the adjusted address will be used by the data memory 103 to store the second data sample. The address generation unit 204 may adjust the address within the address register 202 in a variety of ways. For example, the adjustment may be incrementing the address, decrementing the address, off setting the address or any means of address updates.

After each address adjustment, the address comparator 203 compares the address currently stored in the address register 202 with the address stored in the comparison register 201. When the addresses match, the address comparator 203 generates an end-of-frame interrupt service request 205.

If the processing device 100 is receiving multiple input signals, the comparison registers 201 and address registers 202 store the beginning and ending address for each input signal data block. For each signal being received, the address generation unit 204 and the address comparator 203 perform the above mentioned end-of-frame detection process with priority being given to one of the input signal data blocks. Priority is determined by the user of the processing device 100 and may be established in a variety of ways. Thus, when one of the signals has been received as a data block, the address comparator 203 produces an end-of-frame signal 205 for that input signal. If two or more input signals have been received as a data block at substantially the same time, the address comparator generates an end-of-frame signal 205 for the input signal having the highest priority then, after the priority signal has been processed, the address comparator generates an end-of-frame signal 205 for the next priority level input signal.

Figure 3:
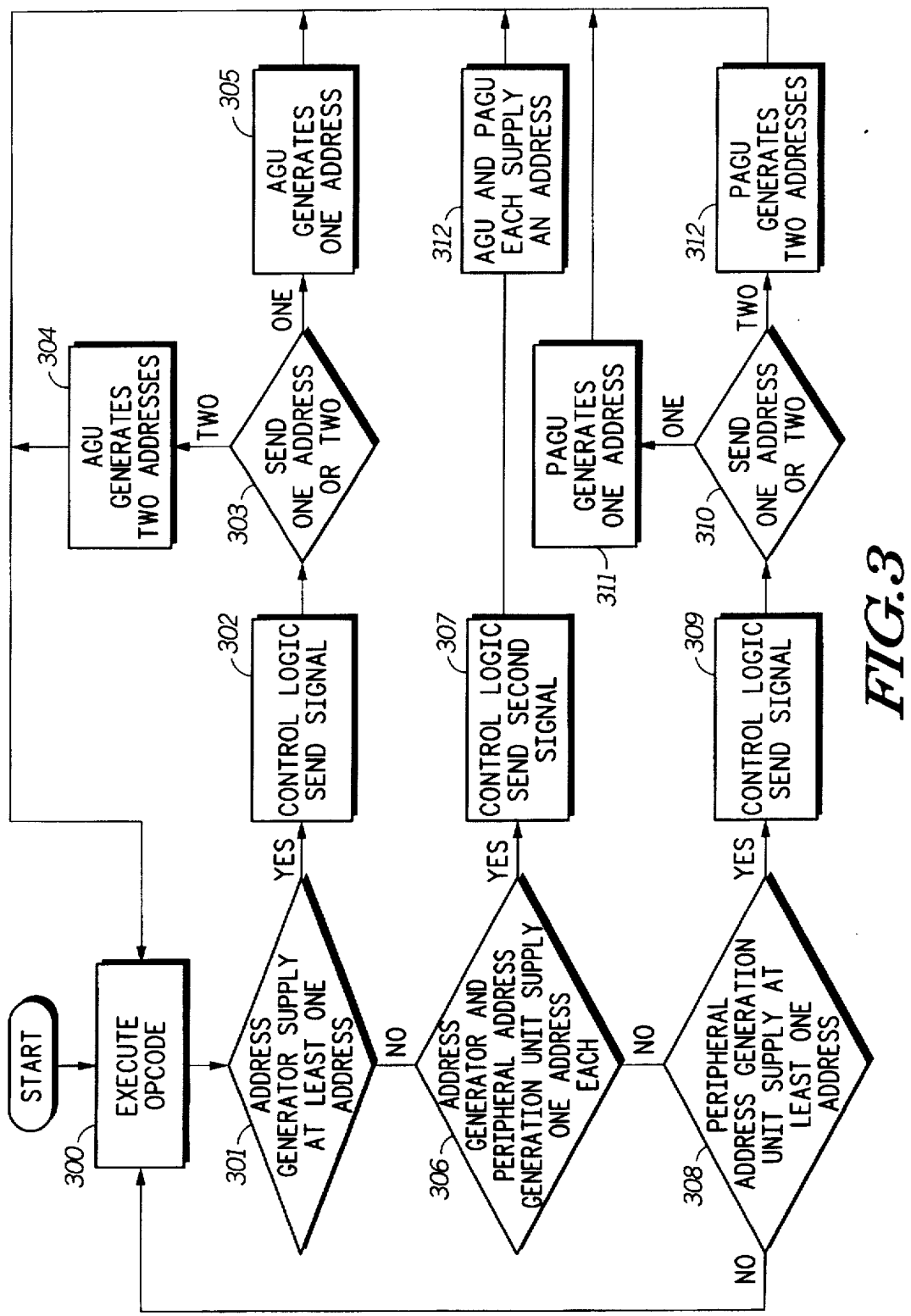
FIG. 3 illustrates a logic diagram which may be used within a processor to implement the present invention.

FIG. 3 illustrates a logic diagram that may be used by the processing device to implement the present invention. At step 300, the processing device is executing a set of op codes. The op codes may be the main program, a fast interrupt op codes, or long interrupt op codes. Regardless of the type of op codes being executed, the control logic determines whether the address generator, the peripheral address generation unit, or both will provide the addresses to the data memory 301, 306, 308. As mentioned above, the control logic determines which unit will provide the addresses based on how the processing devices is programmed by the user.

If the control logic determines that the address generation unit will supply at least one address to the data memory 301, the control logic sends a signal to the AGU and to the peripheral address generation unit 302. Upon receiving this signal, the AGU and the PAGU determine that the PAGU is disabled while the AGU is enabled to provide the addresses. In addition to determining which unit generates the address, the AGU determines whether the signal is indicating that one or two addresses are to be generated 303. If one address is to be generated, the AGU generates one address 305. If the signal indicates that two addresses are to be generated 303, the AGU generates two addresses 304. Once the address or addresses have been generated, the process repeats at step 300.

If the control logic has determined that the address generation unit and peripheral address generation unit are to each generate an address 306, the control logic sends a second signal to each of these devices 307. The second signal indicates that the AGU an PAGU are each to supply an address and on which address bus. Having determined this, the AGU and PAGU each supply an address to the data memory on the appropriate address buses 312. Upon supplying the addresses, the process repeats at step 300.

If the control logic has determined that the peripheral address generation unit will supply at least one address 308, the control logic sends a third signal to the AGU and PAGU 309. Upon receiving this signal, the AGU and PAGU each determine that the PAGU is active while the AGU is idle for this process. Next, the PAGU determines whether one or two addresses are to be generated 310. If one address is to be generated, the PAGU generates one address and supplies it on the appropriate address bus 311. If, however, the PAGU determines that two addresses are to be sent 310, the PAGU generates two addresses and applies them to the first and second address buses 312. Upon supplying the addresses, the process repeats at step 300.

Figure 4:
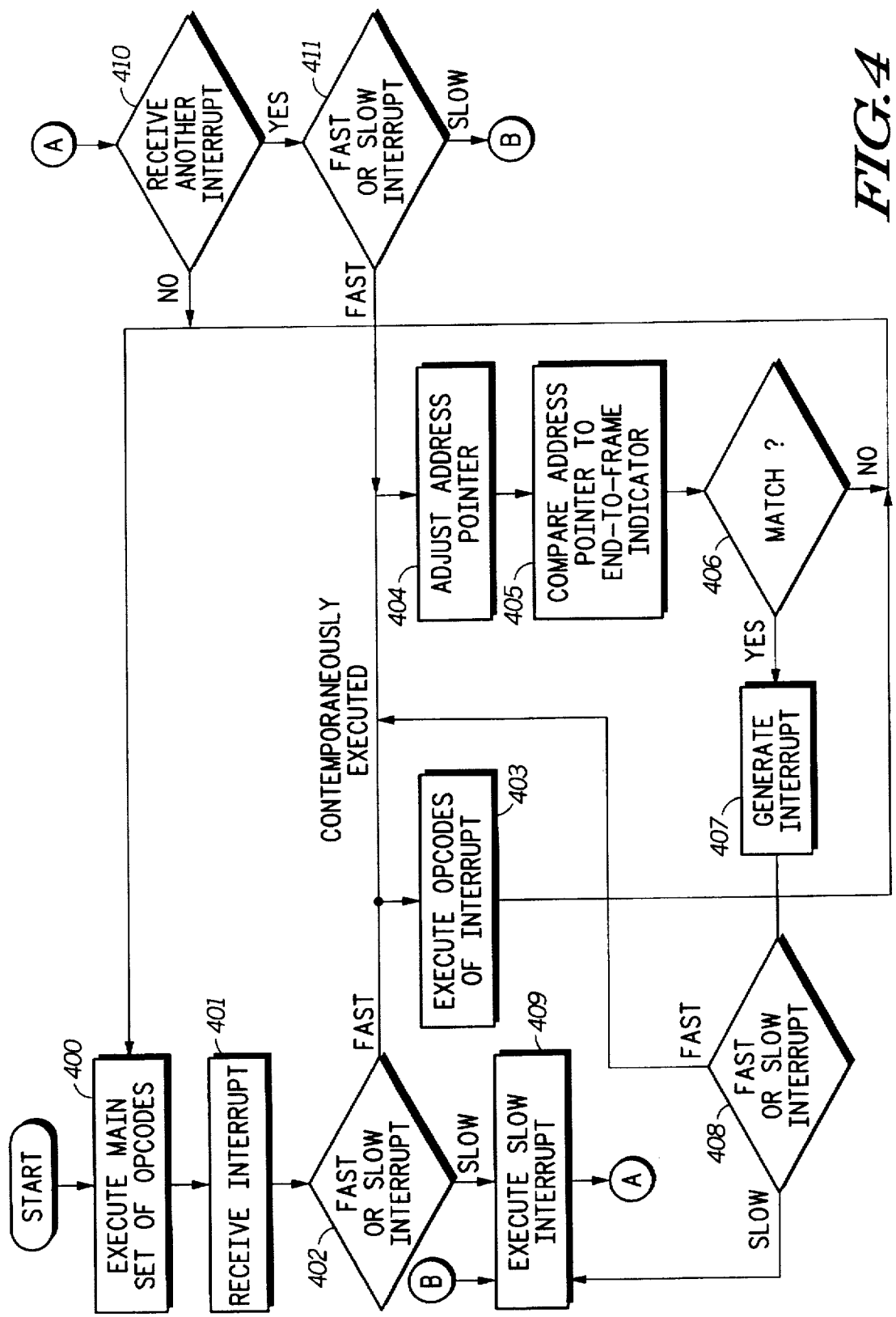
FIG. 4 illustrates a logic diagram which may be used within a processor to implement a more particular embodiment of the present invention.

FIG. 4 illustrates a logic diagram that the processing device may use to implement a more particular embodiment of the present invention. At step 400, the processing device is executing a main set of operational codes. While executing the main set of operational codes an interrupt is received 401. Upon receiving the interrupt, the processing device determines whether it is a fast or slow interrupt 402. For a fast interrupt 402, the processing device contemporaneously executes the op codes identified in the interrupt 403 and a data block identification routine within the PAGU. The data block identification routine includes adjusting an address pointer 404, comparing the address pointer to an end of frame indicator 405, wherein the end of frame indicator is stored in the comparison register 201, and upon doing the comparison, the PAGU determines whether the address pointer matches the end of frame indicator 406. If a match does not occur 406, the process returns to step 400 wherein the processing device continues executing the main set of operational codes. Note that the fast interrupt, while beginning at the same time as the data block identification routine, may be completed and the main program may have resumed before the data block identification routine is completed.

If however, the address pointer matches the end of frame indicator 406, the PAGU generates an interrupt 407. Typically the interrupt will be for a data block service routine request. For example, in a DSP that is performing an audio compression algorithm, the data block service request will be for executing the audio compression algorithm on the received audio data block, filtering the audio data block, or any other audio manipulations.

Upon generation of the interrupt 407, the processor determines whether it is for a fast or slow interrupt 408. For a fast interrupt, the processes are repeated at step 403 and 404. If however, the interrupt 401 or 407 is for a slow interrupt, the main set of operational codes is interrupted wherein the main program is flagged. Upon flagging the main program, the slow interrupt is executed 409. The slow interrupt may be for the data block service request, or for utilization of any on- chip peripheral devices such as for a host peripheral device, for a codec peripheral device, for a timer, for reduced serial synchronous interface, or for general purpose input/output information. While executing the slow interrupt, 409, the processing device determines whether it receives another interrupt 410. When another interrupt is received 410, the processing device determines whether it is for a fast or slow interrupt 411. For a fast interrupt, steps 403 and 404 are repeated while for a slow interrupt step 409 is repeated.

The present invention provides a method and apparatus for identifying a received data block in a processor. With such a method and apparatus, the long interrupt requirements of prior art processors is substantially eliminated. With the present invention, fast interrupts can be utilized to store received input sampled signals until a complete block has been identified. Once a complete block is identified, a long interrupt is initiated to service the data block. Whereas, in prior art processors, for each input sampled signal, a long interrupt was required to be executed. Thus the present invention reduces the number of operational steps needed to receive and store sampled input signals and thus increases the efficiency of processing devices.

We claim:

1. In a processor, a method for generating addresses for a data memory device, the method comprising the steps of:

a) receiving data from peripheral device over a data bus;

b) generating, by control logic, a first signal;

c) transmitting, by the control logic, the first signal to an address generation unit and a peripheral address generation unit;

d) generating, by the address generation unit, a first address for the data memory device when the first signal has a first logic state, indicating that an address register associated with the address generation unit is available for use in generating the first address for the data memory device;

e) generating, by the peripheral address generation unit and not the address generation unit, the first address for the data memory device when the first signal has a second logic state, indicating that an address register associated with the address generation unit is not available for use in generating the first address for the data memory device because all registers associated with the address generation unit are being, utilized by the address generation unit to generate a second address other than the first address; and f) storing the received data in the data memory device at the first address.

2. The method of claim 1 further comprising the steps of:

g) generating, by the control logic, a second signal;

h) transmitting, by the control logic, the second signal to the address generation unit and the peripheral address generation unit;

i) interpreting, by the address generation unit and the peripheral address generation unit, the second signal to determine that the peripheral address generation unit is to generate at least one address for the data memory device while the address generation unit remains idle; and j) generating, by the peripheral address generation unit, the at least one address for the data memory device.

3. The method of claim 1, wherein step (b) further comprises generating the first signal in response to a fast interrupt instruction.

4. The method of claim 3, wherein step (e) further comprises generating, by the peripheral address generation unit, at least one address for the data memory device, wherein the data memory device stores operational codes for the fast interrupt at the at least one address.

5. A processor comprising:

an address generator unit for generating a first data memory address for storing a data sample;

data memory that is operably connected to the address generator via a first address bus for storing the data sample;

a peripheral address generation unit operably coupled to the data memory via the first address bus, for generating the first data memory address for storing the data sample; and control logic that is operably coupled to the address generator unit and the peripheral address generation unit, wherein, when the control logic provides a first signal, the peripheral address generation unit, and not the address generator unit, provides the first data memory address for storing the data sample, and wherein the first signal is generated when a fast interrupt is received and an address register necessary for generating the first data memory address is not available to the address generator unit.

6. The processor of claim 5, wherein, when the control logic provides a second signal, the address generator unit provides the first address to store the data sample and the peripheral address generation unit provides a second address to access the data memory.

7. The processor of claim 5, wherein, when the control logic provides a second signal, the peripheral address generation unit provides the first data memory address and a second address to access the data memory.

8. The processor of claim 5, wherein the peripheral address generation unit further comprises:

an address generation unit;

an address register that is operably coupled to the address generation unit;

a comparison register that is operably coupled to the address register; and a comparator that is operably coupled to the address generation unit, the address register, and the comparison register, wherein the comparator compares an entry in the comparison register with an entry in the address register, and when the entry in the address register matches the entry in the comparison register, the comparator generates an end-of-frame interrupt.

9. The processor of claim 8 further comprises:

a second address register that is operably coupled to the address generation unit and the comparator;

a second comparison register that is operably coupled to the second address register and the comparator, wherein the comparator compares an entry in the second comparison register with an entry in the second address register, and when the entry in the second address register matches the entry in the second comparison register, the comparator generates an end-of-frame interrupt.

* * * * *